United States Patent
Wetherell et al.

(10) Patent No.: US 12,386,413 B2
(45) Date of Patent: Aug. 12, 2025

(54) MODULAR OMNIDIRECTIONAL ACTUATED FLOORS PROVIDING AN INTERACTIVE USER EXPERIENCE

(71) Applicant: DISNEY ENTERPRISES, INC., Burbank, CA (US)

(72) Inventors: Jack Wetherell, Burbank, CA (US); Robert J. Bristow, Shadow Hills, CA (US); Lanny S. Smoot, Thousand Oaks, CA (US); Alfredo M. Ayala, West Covina, CA (US); Michael Ryan Enriquez Arevalo, Santa Clarita, CA (US); Frank D. Mezzatesta, III, Glendale, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 18/377,024

(22) Filed: Oct. 5, 2023

(65) Prior Publication Data

US 2025/0117069 A1    Apr. 10, 2025

(51) Int. Cl.
     *G06F 3/01*      (2006.01)
     *A63G 31/16*      (2006.01)

(52) U.S. Cl.
     CPC ............. *G06F 3/011* (2013.01); *A63G 31/16* (2013.01); *G06F 3/017* (2013.01); *G06F 2203/012* (2013.01)

(58) Field of Classification Search
     CPC . G09G 2300/02–026; G06F 3/011–017; G06F 2203/012; A63G 31/16
See application file for complete search history.

(56) References Cited

U.S. PATENT DOCUMENTS

| | | | |
|---|---|---|---|
| 6,152,854 A | 11/2000 | Carmein | |
| 7,775,883 B2 | 8/2010 | Smoot et al. | |
| 10,416,754 B2 | 9/2019 | Smoot et al. | |
| 10,732,197 B2 | 8/2020 | Smoot et al. | |
| 10,945,484 B1* | 3/2021 | Wang | G06F 3/045 |
| 2004/0102247 A1* | 5/2004 | Smoot | G07F 17/32 |
| | | | 463/36 |
| 2007/0109259 A1 | 5/2007 | Liu | |

(Continued)

OTHER PUBLICATIONS

U.S. Appl. No. 18/376,930 entitled "Systems and Methods to Simulate the Movement and Interaction of Objects on Modular Omnidirectional Actuated Floors" filed Oct. 5, 2023, 37 pages.

(Continued)

*Primary Examiner* — Hang Lin
(74) *Attorney, Agent, or Firm* — Dorsey & Whitney LLP

(57) ABSTRACT

An interactive user experience system is disclosed. The system includes a processor, a display in electrical communication with the processor and configured to display a visual content of interactive content, a modular tile floor in electrical communication with the processor and including a plurality of tiles configured to move independently to induce or respond to a desired motion for a user in contact with the modular tile floor, a sensor in electrical communication with the processor. The sensor detects at least one of an orientation or a position of the user on the modular tile floor, and based on the detected orientation or position of the user, the processor modifies at least one of the visual content or a movement of the plurality of tiles.

19 Claims, 11 Drawing Sheets

(56) References Cited

U.S. PATENT DOCUMENTS

| | | | |
|---|---|---|---|
| 2009/0058855 A1 | 3/2009 | Mishra et al. | |
| 2017/0336860 A1 | 11/2017 | Smoot et al. | |
| 2018/0217662 A1* | 8/2018 | Smoot | A63B 24/0021 |
| 2019/0262727 A1* | 8/2019 | Trombetta | H04N 21/235 |
| 2022/0171469 A1* | 6/2022 | Schwarz | G06F 3/011 |

OTHER PUBLICATIONS

U.S. Appl. No. 18/376,986 entitled "Systems and Methods Utilizing Modular Omnidirectional Actuated Floors in an Amusement Park Ride" filed Oct. 5, 2023, 49 pages.

U.S. Appl. No. 18/782,381 entitled "Modular Omnidirectional Actuated Floors Providing a Reconfigurable Video Production Environment" filed Jul. 24, 2024, 37 pages.

Extended European Search Report for European Patent Application No. 24204433.7 dated Feb. 13, 2025, 8 pages.

\* cited by examiner

MODULAR OMNIDIRECTIONAL ACTUATED FLOORS PROVIDING AN INTERACTIVE USER EXPERIENCE

FIELD

The present application relates to systems and methods of simulating movement corresponding to interactive content to provide an immersive user experience.

BACKGROUND

Various gaming or simulated experiences attempt to provide immersive experiences to consumers. Current immersive experiences include gaming devices, simulation systems, or amusement rides. However, the experiences often fail to effectively simulate the entirety of the experience. For example, many experiences do not allow users to move during interaction with the device limiting engagement with the experience. For simulated experiences that do allow a user to move during the experience, the movement is often limited to a predefined set of movements. The predefined movements may be unnatural or may make a user aware of the boundaries of the system and limit user engagement or enjoyment with the experience.

Accordingly, there is a need for a system providing an immersive experience and allowing a user to move naturally or in unique ways during the experience.

BRIEF SUMMARY

In one example, an interactive user experience system includes a processor, a display in electrical communication with the processor and configured to display a visual content of interactive content, a modular tile floor in electrical communication with the processor and including a plurality of tiles configured to move independently to induce or respond to a desired motion for a user in contact with the modular tile floor, a sensor in electrical communication with the processor, wherein the sensor detects at least one of an orientation or a position of the user on the modular tile floor, and based on the detected orientation or position of the user, the processor modifies at least one of the visual content or a movement of the plurality of tiles.

In some examples, the display is one or more of a wearable display, a projector, or an electronic screen.

In some examples, the visual content is displayed on the modular tile floor by the projector.

In some examples, the visual content depicts a simulated environment, and the sensor detects movement from the user as feedback corresponding to the interactive content.

In some examples, the movement of the plurality of tiles changes the position of the user corresponding to the feedback.

In some examples, the system further includes an elevating system, wherein a first set of tiles are raised or lowered by the elevating system to define a difference in elevation relative to a second set of tiles and the difference in elevation corresponds to the visual content.

In some examples, the visual content is correspondingly updated in response to one or more of a change in the position of the user, a change in the orientation of the user, or a motion of the user.

In some examples, the sensor is one or more of a light ranging and detection system, a plurality of cameras, or a wearable motion capture device.

In some examples, the sensor determines a position of the user relative to the modular tile floor, and the desired motion prevents the user from crossing a boundary of the modular tile floor.

In some examples, the system further includes an input device, the input device in communication with one or more processors or the modular tile floor and corresponding to the interactive content, and the input device receives an input from the user and provides feedback to the user.

In some examples, the input device receives a second input from a second user different from the user, the second input providing feedback to the user.

In some examples, the movement of the plurality of tiles is correspondingly updated in response to one or more of a change in the position of the user, a change in the orientation of the user, a motion of the user, or a change in the visual content.

In some examples, the sensor determines a gesture of the user, the gesture defining an input to the visual content.

In some examples, the system further includes an object positioned on the modular tile floor, the position of the object controlled by the modular tile floor responsive to a position of the user or corresponding to the visual content In one example, a method for providing an interactive user experience with a modular tile floor includes determining a simulated experience from interactive content, displaying visual content to a user corresponding to the interactive content, determining a current orientation of the user relative to the modular tile floor by a sensor, and manipulating a position of the user by the modular tile floor responsive to the simulated experience and the current orientation of the user.

In some examples, the method further includes determining an action of the user by the sensor, and providing feedback to the user by the modular tile floor corresponding to the action and the interactive content.

In some examples, the method further includes determining an action of the user by the sensor, and updating the visual content corresponding to the action and the interactive content.

In some examples, the method further includes receiving an input from the user by a user device, and providing feedback to the user corresponding to the input and the interactive content.

In some examples, the method further includes receiving an input from a third party, different from the user, and providing feedback to the user corresponding to the input and the interactive content.

In some examples, the method further includes manipulating a position of an object or objects on the modular tile floor.

DETAILED DESCRIPTION

The system described herein may include a modular tile floor including a plurality of active tiles associated with interactive content to provide an interactive user experience. The active tiles may move or orient various objects or a user on the floor. For example, a user may walk, jump, or otherwise move on the modular tile floor. The movement of the active tiles may correspond to the interactive content, such as visual portions of the interactive content.

The system may include one or more displays to provide visual content or portions of the interactive content to the user. The display may be on a screen or screens, or an image projected onto the modular tile floor. For example, a projector may be arranged to generate an image on the modular floor. The system may include one or more sensors to determine a position of the user relative to the modular floor. In some examples, additional objects or users may be on the modular floor and similarly tracked by the sensors. In some examples, the system may provide an input device to the user for inputs to the system corresponding to the interactive content.

In operation, the system may create an immersive experience for the user corresponding to the interactive content. The display or projector may provide visual content corresponding to a simulated world or virtual environment. The interactive content may be in communication with the modular floor to provide the user with simulated feedback corresponding to the interactive content. For example, the modular floor may move or arrange a user in a manner corresponding to the interactive content. The various sensors may detect the movements or the position of the user as an input to the interactive content. For example, the sensors may detect the user move (e.g. walk, run, jump, etc.) in a first direction and cause the modular floor to move in an opposite or different direction to prevent the user from moving relative to the modular floor to maintain the user's position on the modular floor. In some examples, images displayed on the modular floor add to the immersive experience, such as displaying a portion of the visual content (e.g. pathway, location, icons, etc.) to the user. Additional objects or user may be placed on the modular floor to provide interactive experiences between the interactive content and the tangible world.

Figure 1:
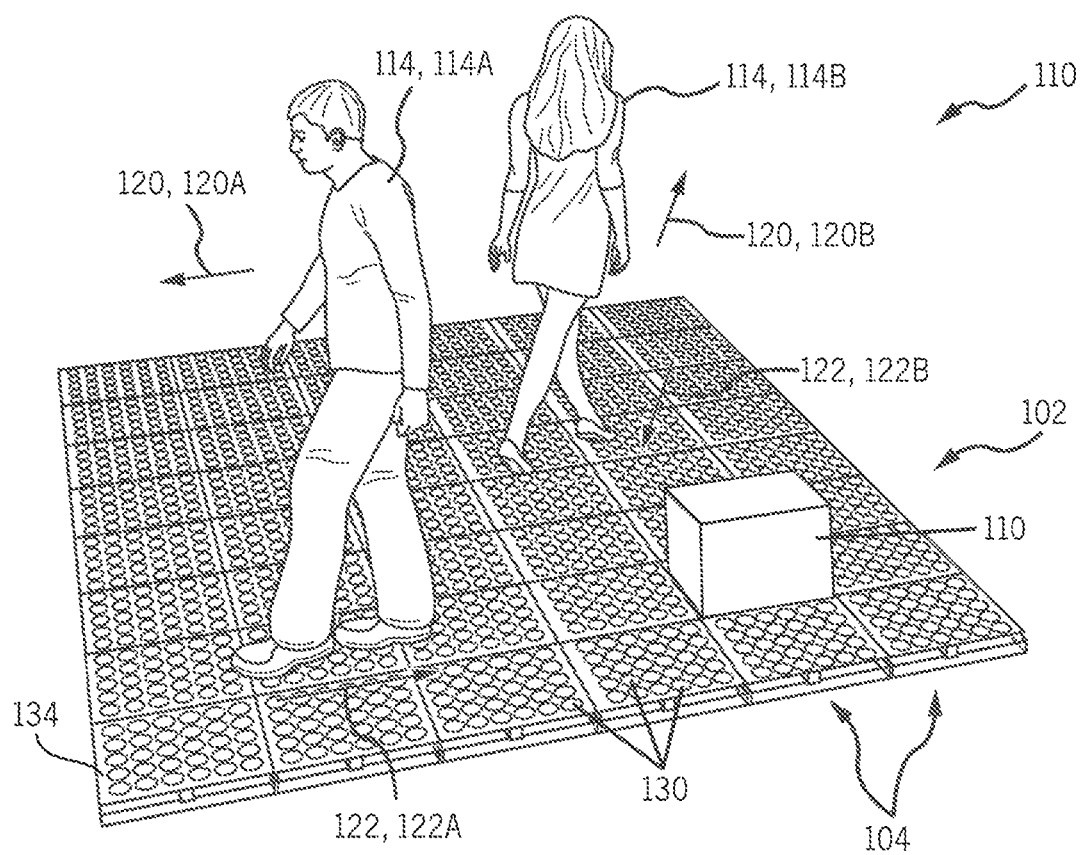
FIG. 1 illustrates an example motion system including a modular floor formed with a plurality of active tiles.

Turning to the figures, FIG. 1 illustrates an example motion system 100 including a modular floor 102 formed with a plurality of active tiles 104. The tiles 104 may be of the same or similar shape, such that multiple tiles 104 may be connected together to form the modular floor 102. For example, the tiles 104 may include a polygonal shape that allows multiple tiles 104 to be connected together to form an integrated surface of the modular floor 102. The polygonal shape may be any closed plane figure bounded by three or more line segments, such as three line segments defining a triangular shape, four line segments defining a quadrilateral shape, or more than four line segments defining another polygonal shape (e.g., six line segments defining a hexagonal shape, among other suitable shapes). In such examples, any number of tiles 104 may be connected together to define the modular floor 102 of a desired size and shape. The various tiles 104 may be coupled together such as by interlocking or coupling features, or a mounting frame 134 that may secure or hold the tiles 104 in place. The tiles 104 may be positioned adjacent one another to define the modular floor 102.

As described herein, the motion system 100 may provide or facilitate motion of one or more objects 110 on the modular floor 102. For instance, the motion system 100 may move one or more objects 110 across the modular floor 102, such as from a first location to a second location on the modular floor 102. Additionally, or alternatively, the motion system 100 may allow one or more user participants 114 to move across the modular floor 102 or walk/run on the modular floor 102, such as part of an exercise program, a gaming system, a control system, or the like. Such examples are non-limiting, and the modular floor 102 may provide or facilitate motion of any object positioned at least partially on the modular floor 102. For example, in some embodiments, the modular floor 102 may provide or facilitate motion of ride vehicles, gaming objects, containers, or any other object placed or positioned on the modular floor 102.

In one example, the modular floor 102 may be operated to allow a user participant 114 to walk or run under the user's own power. In such examples, a set of tiles 104 (or at least components of the set of tiles 104) associated with the present location and a predicted travel path 120 of the user participant 114 may be operated concurrently and in a like manner to move in another direction 122, such as opposite the current or predicted travel path 120. In this manner, the motion system 100 may control a position of the user participant 114 on the modular floor 102 (e.g., maintained at a specific location), even while the user participant 114 is walking or running, such as to limit the user participant 114 from walking off the modular floor 102 and/or to avoid a collision with another object 110 or user participant 114 on the modular floor 102. The motion 122 imparted to the user participant 114 may slow the movement of the user participant 114 relative to the modular floor 102 (e.g., the user participant 114 moves at a rate that is slower than the user's walking/running pace), halt the relative motion (e.g., the user participant 114 effectively walks/runs in place), or increase the relative motion (e.g., the user participant 114 moves at a rate that is faster than the user's walking/running pace).

In one example, the motion system 100 may be used to support independent movement of multiple (e.g., two or more) user participants 114. For instance, as shown, the motion system 100 may support a first user participant 114A moving (e.g., walking, running, etc.) along a first travel path 120A, and a second user participant 114B moving (e.g., walking, running, etc.) along a second travel path 120B that differs from the first travel path 120A. In such examples, the motion system 100 may impart respective motion 122A, 122B on the first and second user participants 114A, 114B, such as in a manner as described above. The motions 122A, 122B imparted to the user participants 114A, 114B may be independent and concurrent, even while different in the example illustrated. In some examples, the modular floor 102 may be configured to move or facilitate movement of an object 110 or user participant 114 in any direction (e.g., any lateral direction across the modular floor 102), such that the modular floor 102 may be considered an omnidirectional actuated floor.

The motion control described herein may be provided by one or more disk assemblies 130 of the motion system 100. As shown, the tiles 104 may include one or more disk assemblies 130, such as a plurality of disk assemblies 130. In such examples, the disk assemblies 130 may support the one or more objects 110 or user participants 114 on the modular floor 102. The disk assemblies 130 may be operated to move the objects 110/user participants 114 on the modular floor 102, such as in a manner as described herein. For example, the disk assemblies 130 may engage the objects 110/user participants 114 so as to move the objects 110/user participants 114 as the disk assemblies 130 are operated, as described herein.

Figure 2:
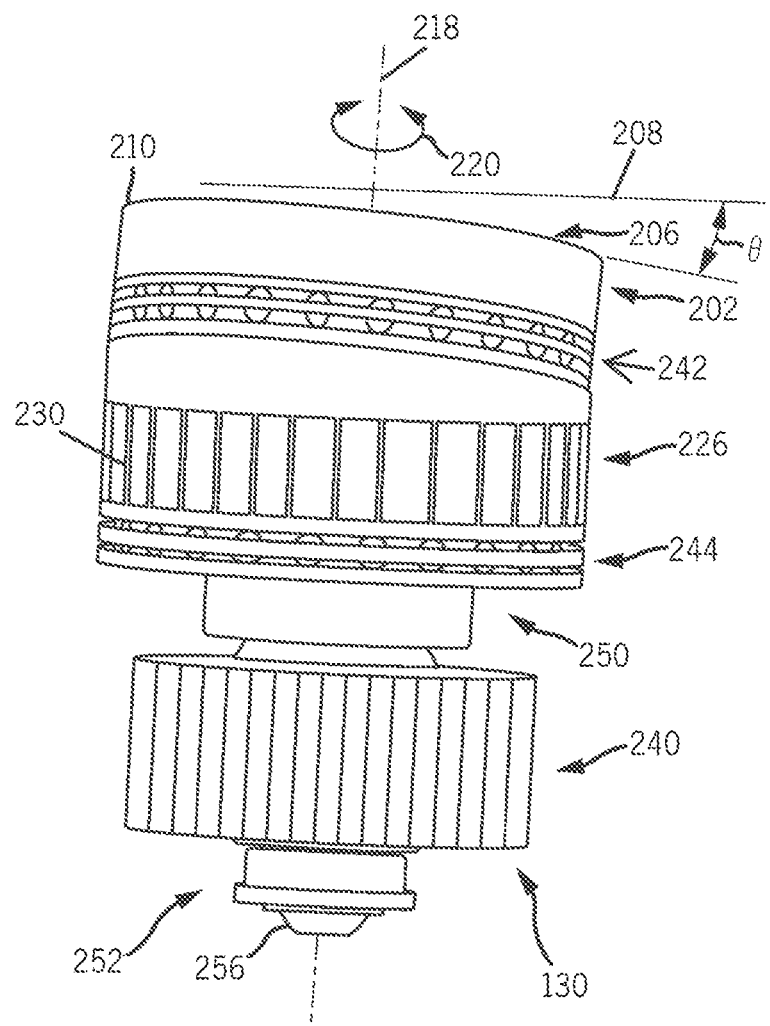
FIG. 2 illustrates an example disk assembly for use in a motion system of the present disclosure.
Figure 3:
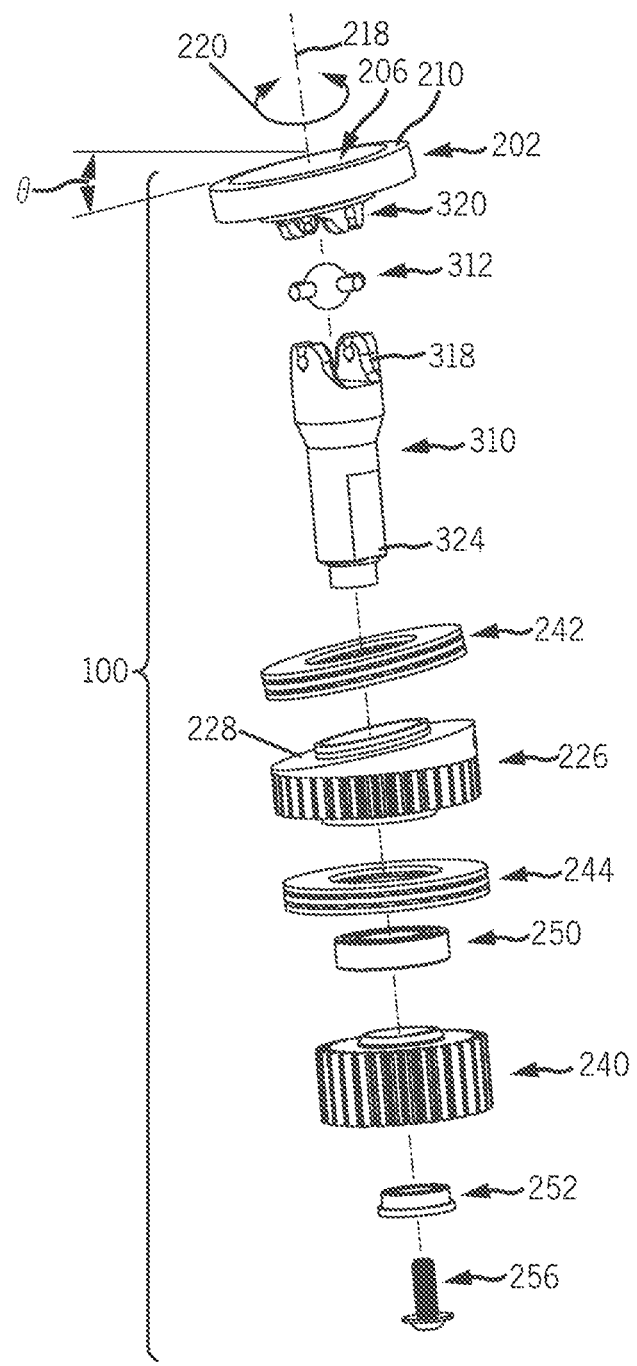
FIG. 3 illustrates an exploded view of the disk assembly of FIG. 2.

FIG. 2 illustrates an example disk assembly 130 for use in a system of the present description (e.g., motion system 100, described above), such as with a plurality of other disk assemblies 130 in an active tile 104. FIG. 3 illustrates an exploded view of the disk assembly 130. The disk assembly 130 may include a contact disk 202. The contact disk 202 may be at a first end 204 (e.g., an outer or exposed end) of the disk assembly 130 and includes an upper surface 206. In one example, the upper surface 206 may be used in the modular floor 102 described herein, such as with a plurality of other surfaces to support and move an object 110. The contact disk 202 may be positioned and/or supported in the disk assembly 130 so as to place the upper surface 206 at a tilt angle θ, such as relative to the plane 208 of the active tile 104. In one example, the upper surface 206 may include a contact surface 210 defined by a raised segment or edge relative to the rest of the upper surface 206. In such examples, the contact surface 210 (along with similar segments/portions of other contact disks in an active tile 104) may contact and support an object placed on the disk assembly 130. The tilt angle θ may be an angle of 5 to 60 degrees, with about 8 to 15 degrees being useful in some examples, and about 10 degrees (e.g., 9.5 to 10.5 degrees) being useful in one implementation.

During use, the contact disk 202 may be rotated about a rotation axis 218, such as shown by arrows 220. As shown, the rotation axis 218 extends at a non-orthogonal angle to the plane of the upper surface 206. In this manner, the contact surface 210 of the contact disk 202 may be positioned at a predefined location relative to the rotation axis 218 during operation of the disk assembly 130, such as to move a supported object in a desired direction, as described herein. For example, the disk assembly 130 may include a swashplate 226 provided with an angled or tilted surface 228 to support the contact disk 202 at the tilt angle θ. The swashplate 226 may be drivable to selectively change where the contact surface 210 is located relative to the rotation axis 218. For instance, the swashplate 226 may be drivable via outer teeth 230 as shown in FIG. 2, be belt driven, or the like. In such examples, selective positioning of the contact surface 210 via rotation of the swashplate 226 may control which direction a supported object is moved. In one example, the swashplate 226 may remain stationary or fixed in place relative to the rotation axis 218 during the rotation 220 of the contact disk 202.

The disk assembly 130 may include various drive components and bearings to support or facilitate rotation of the contact disk 202 under load. For example, the disk assembly 130 may include a gear 240 for rotating the contact disk 202 about the rotation axis 218, as detailed herein. A first thrust bearing 242 may be positioned between the contact disc and the swashplate 226, such as to reduce friction between the contact disc and the swashplate 226. A second thrust bearing 244 may be positioned between the swashplate 226 and the gear 240, such as to reduce friction between the swashplate 226 and the gear 240. The first and second thrust bearings 242, 244 may be configured to transfer a load on the contact disk 202 downward into the disk assembly 130 (e.g., into the stack of components of the disk assembly 130). For instance, the first thrust bearing 242 may transfer a downward load from the contact disk 202 onto the swashplate 226, and the second thrust bearing 244 may transfer the downward load from the swashplate 226 onto the gear 240. In some examples, the disk assembly 130 may include a top bearing 250 and a bottom bearing 252, such as for the purposes described below. A fastener 256 may secure the components of the disk assembly 130 together as an operable unit.

Referring to FIG. 3, the disk assembly 130 may include a drive shaft 310. The drive shaft 310 may be coupled to the contact disk 202 and driven by the gear 240. For instance, the disk assembly 130 may include a U-joint 312 pivotally coupled to both an end 318 of the drive shaft 310 and an underside 320 of the contact disk 202. The U-joint 312 may allow the contact disk 202 to be rotated while the high-point or contact surface 210 of the contact disk 202 is turned or redirected via the swashplate 226 to change the tilt direction or disk orientation of the contact disk 202 (e.g., to change the location of the contact surface 210 relative to the rotation axis 218). The drive shaft 310 may be coupled to the gear 240 (e.g., via a keyed engagement 324) such that rotation of the gear 240 rotates the drive shaft 310. In such examples, rotation of the gear 240 causes the drive shaft 310 to rotate, which, in turn, causes the contact disk 202 to rotate about the rotation axis 218. With continued reference to FIG. 3, the top and bottom bearings 250, 252 may rotationally support the drive shaft 310, such as centering the drive shaft 310 within the disk assembly 130.

According to various examples described herein, the contact disk 202 is supported at the tilt angle θ by the tilted surface 228 of the swashplate 226 and then selectively rotated 220 about the rotation axis 218 while the swashplate 226 remains stationary, such as to move an object supported upon the contact surface 210 of the upper surface 206. Rotation 220 may be provided through a disk rotation mechanism (which includes at least the gear 240) in the disk assembly 130 that works in combination with a drive system (not shown in FIGS. 2-3) (e.g., one or more motors driving belts, screw drives, gears, or the like to impart motion on one or more components of the disk rotation mechanism such as upon the outer teeth 230 of the gear 240).

The upper surface 206 is circular in shape in the illustrated embodiment, with the contact surface 210 being an outer ring-shaped surface or lip configured to engage surfaces of a supported object. The contact disk 202 is positioned or supported at the disk or tilt angle θ (e.g., an angle in the range of 5 to 60 degrees or the like as measured between a horizontal plane and the upper surface 206 of the contact disk 202). Such configurations cause a raised edge or portion of the contact surface 210 to contact and move an object (e.g., a person, a ride vehicle, a container, or any other object) supported upon the contact disk 202. The raised edge/segment may be a fraction of the contact surface 210, such as in the range of 1/10 to 2/5 of the available surface, depending on the magnitude of the tilt angle θ.

The disk assemblies 130 may be adapted for the contact disk 202 to be oriented as desired to set the location of the contact surface 210 relative to the rotation axis 218. For instance, the contact disk 202 may be rotated relative to the rotation axis 218, such as by rotation of the swashplate 226 about the rotation axis 218, to orient the contact disk 202 relative to the rotation axis 218, as described above. In such examples, the orientation of the contact surface 210 relative to the rotation axis 218 may define the direction a supported object is moved by the disk assembly 130.

Figure 4A:
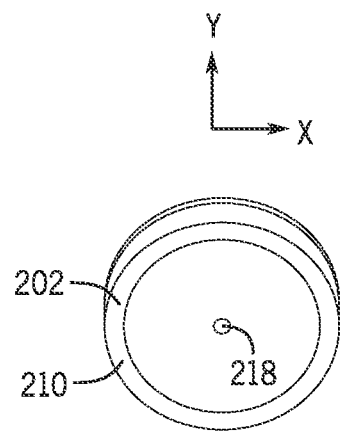
FIGS. 4A-4D illustrate various orientations of a tilted contact disk of the disk assembly of FIG. 2 that define respective directions a supported object is moved by the disk assembly.

For example, FIGS. 4A-4D illustrate various orientations of the contact disk 202 that define respective directions a supported object is moved by the disk assembly 130. Referring to FIG. 4A, the tilt direction or disk orientation of the contact disk 202 may be set with the contact surface 210 at the "top" of the contact disk 202 (when looking at the page containing FIG. 4A). If the contact disk 202 is rotated clockwise about the rotation axis 218, a supported object may be moved in a positive X direction or to the right when looking at the page containing FIG. 4A. Conversely, if the contact disk 202 is rotated counterclockwise about the rotation axis 218, the supported object may be moved in a negative X direction or the left when looking at the page containing FIG. 4A.

Figure 4B:
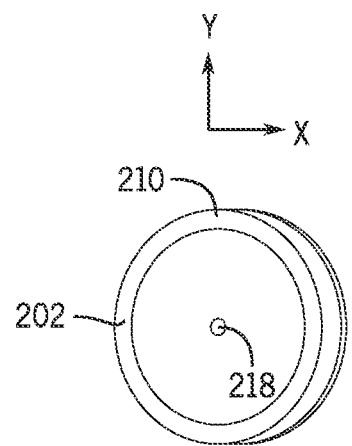

Referring to FIG. 4B, the tilt direction or disk orientation of the contact disk 202 may be set with the contact surface 210 at the "right" of the contact disk 202 (when looking at the page containing FIG. 4B). If the contact disk 202 is rotated clockwise about the rotation axis 218, a supported object may be moved in a negative Y direction or downwards when looking at the page containing FIG. 4B. Conversely, if the contact disk 202 is rotated counterclockwise about the rotation axis 218, the supported object may be moved in a positive Y direction or upwards when looking at the page containing FIG. 4B.

Figure 4C:
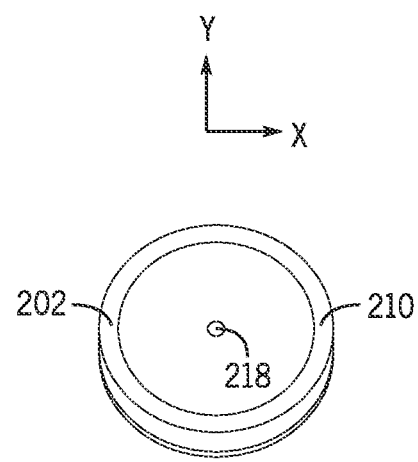

Referring to FIG. 4C, the tilt direction or disk orientation of the contact disk 202 may be set with the contact surface 210 at the "bottom" of the contact disk 202 (when looking at the page containing FIG. 4C). If the contact disk 202 is rotated clockwise about the rotation axis 218, a supported object may be moved in a negative X direction or to the left when looking at the page containing FIG. 4C. Conversely, if the contact disk 202 is rotated counterclockwise about the rotation axis 218, the supported object may be moved in a positive X direction or the right when looking at the page containing FIG. 4C.

Figure 4D:
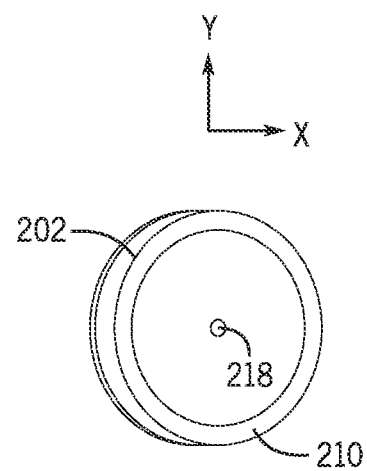

Referring to FIG. 4D, the tilt direction or disk orientation of the contact disk 202 may be set with the contact surface 210 at the "left" of the contact disk 202 (when looking at the page containing FIG. 4D). If the contact disk 202 is rotated clockwise about the rotation axis 218, a supported object may be moved in a positive Y direction or upwards when looking at the page containing FIG. 4D. Conversely, if the contact disk 202 is rotated counterclockwise about the rotation axis 218, the supported object may be moved in a negative Y direction or downwards when looking at the page containing FIG. 4D.

During any particular operation period used to move an object in a particular direction, the components of the disk assembly 130 may be configured for the contact disk 202 to be oriented in any of the four orientations or disk directions illustrated in FIGS. 4A-4D (or to any intermediate position between these four orientations) and for the contact disk 202 to be concurrently rotated at a desired rate or speed about the rotation axis 218, while remaining at the tilt angle θ at the particular disk face orientation/direction. As a result, the disk assemblies 130 may move an object 110 or user participant 114 along (or allow a user participant 114 to walk/run in) any direction across the modular floor 102. In this manner, the disk assemblies 130 may define an omnidirectional actuated floor.

Arrays or pluralities of the disk assemblies 130 may be combined into a single tile 104, and multiple tiles 104 may be combined to provide the modular floor 102 described herein, or can be used in combination to provide a large floor or platform to move supported objects 110. In such embodiments, the drive assemblies may be driven independently; however, it may be useful in some embodiments to concurrently drive an array or subset of the disk assemblies 130 used to make up a support floor/platform, such as by orienting and driving/rotating the contact disks 202 in an active tile 104 similarly (e.g., drive the drive assemblies in an active tile 104 concurrently and similarly to move an object on the tile 104 in a particular direction and at a particular speed).

Figure 5:
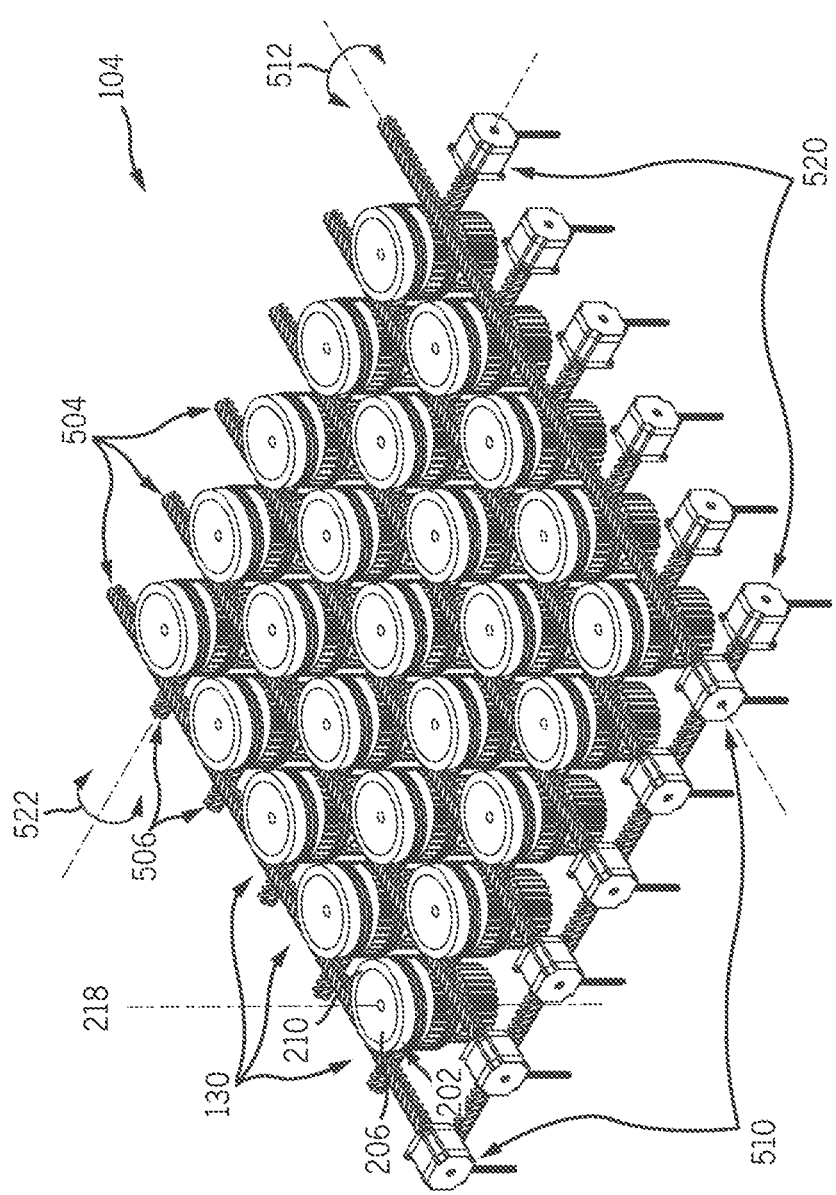
FIG. 5 illustrates a portion of an active tile including an array of disk assemblies.

Accordingly, FIG. 5 illustrates a portion of an active tile 104 including an array or plurality of disk assemblies 130. Referring to FIG. 5, an array or plurality of disk assemblies 130 may be arranged in a pattern. For example, multiple disk assemblies 130 may be arranged in a rectangular pattern of parallel rows and columns, although other configurations are contemplated. The disk assemblies 130 may include parallel rotation axes 218 with the upper surfaces 206 facing a single direction. For example, the contact disks 202 may be oriented to have the same disk direction or to have its tilt angle oriented in the same way. The disk assemblies 130 may be driven together as a set or concurrently to rotate at the same rate and in the same direction about their rotation axes 218. In this manner, the plurality of disk assemblies 130 (or a subset of the disk assemblies 130) may move an object supported thereon in the same direction and at the same rate.

In the embodiment shown in FIG. 5, first lead screws 504 are positioned to contact the outer teeth 230 of the swashplates 226, and second lead screws 506 are positioned to contact the geared/toothed outer surface of the gears 240. One or more drive motors 510 may be selectively controlled to rotate 512 the first lead screws 504 as needed/desired to set the tilt direction or disk orientation of the contact disks 202 (e.g., to orient the contact disks 202 by rotating the swashplates 226 about their respective rotation axis 218), such as to position raised edges of the contact disks 202 concurrently in a desired location. Stated differently, rotation of the first lead screws 504 by the drive motors may cause the swashplates 226 to rotate about their respective rotation axes 218, which, in turn, causes the supported contact disks 202 to likewise rotate to position the contact surfaces 210 at a new location.

Concurrently or at a different time, one or more spin motors 520 may be selectively controlled to rotate the second lead screws 506, thereby driving the gears 240 to rotate (e.g., at the same rate). Rotation of the gears 240 may cause the contact disks 202 to rotate, with the direction of rotation of the contact disks 202 set by a direction of rotation 522 of the second lead screws 506. Similarly, the rate of rotation of the contact disks 202 may be set by the rate of rotation 522 of the second lead screws 506.

Such examples are illustrative only, and the modular floor 102 may be operated using other systems and configurations. For instance, the contact disks 202 may be rotated via intermeshing gears, among other examples. In some examples, one or more (e.g., each) contact disks 202 may be rotated via a gear train including multiple gears. In such examples, one or more motors (e.g., spin motors 510 and/or 520) may be selectively controlled to rotate the gears, thereby causing the contact disks 202 to rotate.

The embodiments illustrated in FIGS. 1-5 are non-limiting examples for providing a motion system including a modular floor formed with a plurality of active tiles, the active tiles having one or more disk assemblies with a rotatable, angled disk and with mechanisms for rotating/spinning the disk and for orienting the disk to have its raised edge/portion in a desired location to direct a supported object in a desired direction during disk rotation. Thus, the motion system 100, modular floor 102, active tiles 104, and disk assemblies 130, described above, are illustrative only, and other configurations are contemplated. In one example, the systems and elements described herein (e.g., the tiles 104 and disk assemblies 130) may be similar to those described in U.S. patent application Ser. No. 15/790,124, now U.S. Pat. No. 10,416,754 B2, and U.S. patent application Ser. No. 16/135,952, now U.S. Pat. No. 10,732,197 B2, the disclosures of which are hereby incorporated by reference for all purposes.

Figure 6:
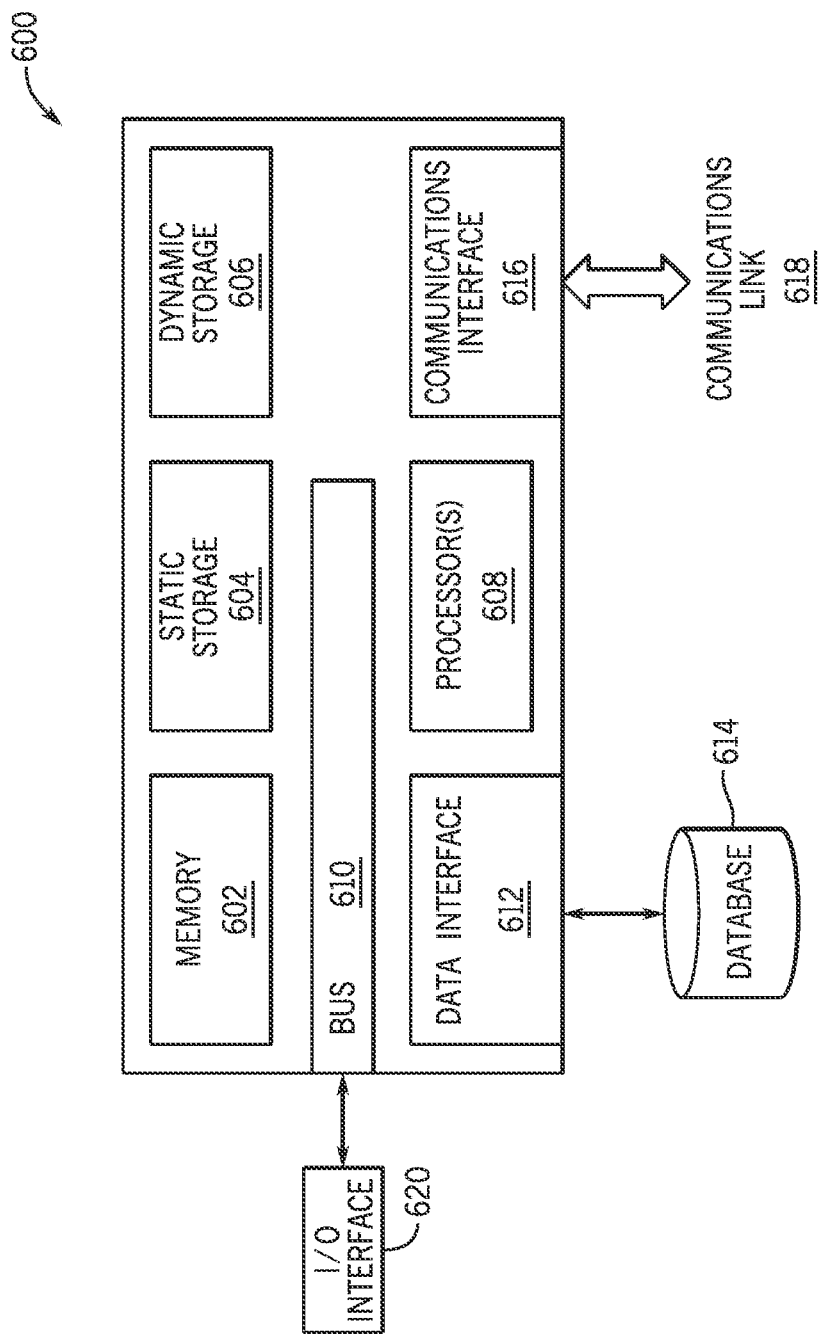
FIG. 6 illustrates an example computing system for implementing various examples of the present disclosure.

FIG. 6 illustrates an example computing system 600 for implementing various examples described herein. For example, in various embodiments, components of the motion system 100 or other systems described herein may be implemented by one or several computing systems 600. This disclosure contemplates any suitable number of computing systems 600. For example, the computing system 600 may be a server, a desktop computing system, a mainframe, a mesh of computing systems, a laptop or notebook computing system, a tablet computing system, an embedded computer system, a system-on-chip, a single-board computing system, or a combination of two or more of these. Where appropriate, the computing system 600 may include one or more computing systems; be unitary or distributed; span multiple locations; span multiple machines; span multiple data centers; or reside in a cloud, which may include one or more cloud components in one or more networks.

Computing system 600 includes a bus 610 (e.g., an address bus and a data bus) or other communication mechanism for communicating information, which interconnects subsystems and devices, such as processor 608, memory 602 (e.g., RAM), static storage 604 (e.g., ROM), dynamic storage 606 (e.g., magnetic or optical), communications interface 616 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 620 (e.g., keyboard, keypad, mouse, microphone). In particular embodiments, the computing system 600 may include one or more of any such components.

In particular embodiments, processor 608 includes hardware for executing instructions, such as those making up a computer program. For example, a processor 608 may execute instructions for various components of the motion system 100 or other systems described herein. The processor 608 circuitry includes circuitry for performing various processing functions, such as executing specific software to perform specific calculations or tasks. In particular embodiments, I/O interface 620 includes hardware, software, or both, providing one or more interfaces for communication between computing system 600 and one or more I/O devices. Computing system 600 may include one or more of these I/O devices, where appropriate. One or more of these I/O devices may enable communication between a person and computing system 600.

In particular embodiments, the communications interface 616 includes hardware, software, or both providing one or more interfaces for communication (such as, for example, packet-based communication) between computing system 600 and one or more other computer systems or one or more networks. One or more memory buses (which may include an address bus and a data bus) may couple processor 608 to memory 602. Bus 610 may include one or more memory buses, as described below. In particular embodiments, one or more memory management units (MMUs) reside between processor 608 and memory 602 and facilitate accesses to memory 602 requested by processor 608. In particular embodiments, bus 610 includes hardware, software, or both coupling components of computing system 600 to one another.

According to particular embodiments, computing system 600 performs specific operations by processor 608 executing one or more sequences of one or more instructions contained in memory 602. For example, instructions for the motion system 100 or other systems described herein may be contained in memory 602 and may be executed by the processor 608. Such instructions may be read into memory 602 from another computer readable/usable medium, such as static storage 604 or dynamic storage 606. In alternative embodiments, hard-wired circuitry may be used in place of or in combination with software instructions. Thus, particular embodiments are not limited to any specific combination of hardware circuitry and/or software. In various embodiments, the term "logic" means any combination of software or hardware that is used to implement all or part of particular embodiments disclosed herein.

The term "computer readable medium" or "computer usable medium" as used herein refers to any medium that participates in providing instructions to processor 608 for execution. Such a medium may take many forms, including but not limited to, nonvolatile media and volatile media. Non-volatile media includes, for example, optical or magnetic disks, such as static storage 604 or dynamic storage 606. Volatile media includes dynamic memory, such as memory 602.

Computing system 600 may transmit and receive messages, data, and instructions, including program, e.g., application code, through communications link 618 and communications interface 616. Received program code may be executed by processor 608 as it is received, and/or stored in static storage 604 or dynamic storage 606, or other storage for later execution. A database 614 may be used to store data accessible by the computing system 600 by way of data interface 612. In various examples, communications link 618 may communicate with the motion system 100 or other systems described herein.

Any of the features, components, and/or parts, including the arrangements and configurations thereof shown in any one of FIG. 6 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 6.

Turning to FIGS. 7-10, example systems 700 providing an interactive user experience are depicted. The system 700 depicted in FIG. 7 may provide interactive content 752 to a user 701 for immersive interaction. The system 700 may display a visual portion 755 of the interactive content 752 to the user 701 and include a movement inducing or modular floor 720 to simulate, induce, and/or create movement or actions for the user 701.

The modular floor 720 may be, or include, similar or the same features as the modular floor 102 discussed above. For example, modular floor 720 may include a plurality of active tiles 722 that may be similar to or the same as the plurality of active tiles 104 described above. The active tiles 722 may similarly include disk assemblies 130. The disk assemblies 130 of the tiles 722 may move an object in a variety of directions (e.g. omnidirectional).

The tiles 722 may be positioned adjacent another tile 722. The tiles 722 or disk assemblies 130 may be arranged in a variety of sizes (e.g. the widths of the tiles 722 or disk assemblies 130) or spacings (e.g. the distance between tiles 722 or disk assemblies 130). The spacings of the tiles 722 may be selected to limit or prevent objects from being placed between tiles 722. For example, to provide movement to an object at least one tile 722 must be in contact with the object. In some examples, the tiles 722 or disk assemblies 130 may be positioned closely or tightly together. For example, the tiles 722 or disk assemblies 130 may be positioned adjacent one another for objects or user's 701 feet 707 to span a distance between the tiles 722 or disk assemblies 130. The tighter spacing may prevent or reduce the risk of a user's 701 foot 707 from unintentionally being placed between tiles 722 or disk assemblies 130. The tighter spacing may position tiles 722 for a user to place their feet on two or more tiles 722 or disk assemblies 130 at any time and therefore to be moved over the floor 720 by the active tiles 722. Accordingly, the tiles 722 or disk assemblies 130 may be arranged such that a distance between two tiles 722 is less than a length or width of an object likely to be placed on the tiles 722.

The tiles 722 may be arranged in various shapes. In some examples, the active tiles 722 may include the same or similar shape, such that multiple tiles 722 may be connected or positioned together to form the modular floor 720. For example, the active tiles 722 may include a polygonal shape for multiple tiles 722 to be connected together to form an integrated surface of the modular floor 720. In one example, the tiles 722 are arranged in a hexagonal shape. In other examples, the tiles 722 may be rectangular, triangular, or arranged into a pattern. The modular floor 720 as a whole may similarly be shaped into a variety of polygons or thematic patterns.

The disk assemblies 130 may move in a similar direction or orientation thereby defining a direction of movement for the tile 722 as a whole. As discussed above, the disk assemblies 130 of an active tile 722 may be driven independently of other disk assemblies 130 of the active tile 722, or together in a similar or same direction. Similarly, active tiles 722 may drive or impart movement in a direction different from or the same as a neighboring active tile 722. Note that while reference may be given to a disk assembly 130 or an active tile 722, in some examples of the system 700 the terms may be used interchangeably. For example, an active tile 722 may include a single disk assembly 130.

The tiles 722 may rotate objects by two or more tiles 722 or disk assemblies 130 providing movement in transverse directions. For example, two adjacently spaced tiles 722, such as a first tile 725 and a second tile 726, may define an axis of rotation 731. The various shapes or sizes of the tiles 722 may assist in orienting objects on the modular floor 720. For example, the shapes of the tiles 722 may be arranged such that intersections between tiles 722 allow objects to pass between tiles 722 or rotate relative to the tiles 722. In an example of a hexagonal tile 722 configuration, a third tile 727 may meet at the axis of rotation 731. Three or more tiles 722 may provide translational and rotational movement.

The modular floor 720 may be located on a platform 715. The platform 715 may support the modular floor 720 and include a surrounding or stationary floor 718. The stationary floor 718 may be positioned adjacent the modular floor 720. For example, a boundary 745 may be defined between the modular floor 720 and the stationary floor 718. In one example, the stationary floor 718 may extend around a perimeter of the modular floor 720, the boundary 745 defining the perimeter. The stationary floor 718 may provide a location for a user 701 to wait prior to stepping on to the modular floor 720. The stationary floor 718 may provide a location for additional users, spectators, or other personal to stand adjacent to the modular floor 720.

The system 700 may include a display or display system 750. The display 750 may be a screen or wearable device providing visual feedback to a user 701. The visual feedback may be the visual portion 755 of the interactive content 752. For example, the display 750 may be an electronic screen or a surface configured to receive a projected image. In some examples, the display 750 may be a virtual reality or augmented reality headset or optical device. In some examples, the system 700 may include various audio systems to provide sound or music.

The display 750 may include a projector 770. The projector 770 may generate one or more images 773. The image 773 generated by the projector 770 may be arranged to create the illusion of depth or texture on a projected surface. In some examples, the display 750 is a primary display and the projector 770 is a secondary display. For example, the projected image 773 may correspond to an image on the display 750. In some examples, the image 773 or the display 750 may produce 3D images viewable by a user 701, such as by glasses or headsets. Accordingly, the system 700 may simulate depth or textures.

The system 700 may include one or more sensors 760. The sensors 760 may detect positions, orientations, or movement of various objects or users on the modular floor 720. For example, the sensors 760 may include a light detection and ranging system (LIDAR), two or more associated cameras, a wearable motion capture device or system, or other systems detecting light or distance to determine a position of an object. The sensors 760 may include pressure sensors, accelerometers, or other devices capable of detecting weight or changes in movement. The sensors 760 may be positioned in various locations of the system 700. For example, the sensors 760 may include a first grouping of sensors 763 in a first location and a second grouping of sensors 766 in a second location. In some examples, the sensors 760 may be included in one or more of the previously discussed components. Positioning sensors 760 in various locations may increase the accuracy or amount of detected positions or movements of objects.

With respect to the user 701, the sensors 760 may detect various features of a user's body or various gestures indicated by the user's body. For example, the sensors 760 may detect the user's head 703, arms 704, upper body or torso 705, legs 706, or feet 707. The sensors 760 may detect the various orientations or movements of the user's 701 respective anatomy, such as relative positions of the legs 706 or feet 707 compared to the rest of the user 701. For example, the sensors 760 may detect movement of the user 701 by a change in position of the user's anatomy, such as a change in position of the legs 706 relative to one another. The positions of the user's anatomy may also be detected as an input to the system 700. For example, the sensors 760 may detect gestures or movements of the user intended to convey meaning, as may be discussed in greater detail with reference to FIG. 9. In one example, an extended arm 704 or gesture may be detected as an input indicating a desired direction of movement responsive to the interactive content 752 or a selection of an option provided by the interactive content 752. In some examples, the gestures of the user 701 may control objects the user's 701 own movement on the modular floor 720 or the movement of another user.

In some examples, the system 700 may include the object 710. The object 710 may be any object movable by the floor 720. In some examples, the object 710 may include thematic features or elements corresponding to the interactive content 752. For example, the object 710 may correspond to a character of the interactive content 752. In some examples, the object 710 may be used to simulate interaction with simulated objects of the interactive content 752. In some examples, the image 773 may be displayed on the object 710 to provide depth to the image 773. In some examples, the gestures of the user 701 discussed above, may be used to control movement of the object 710.

Figure 7:
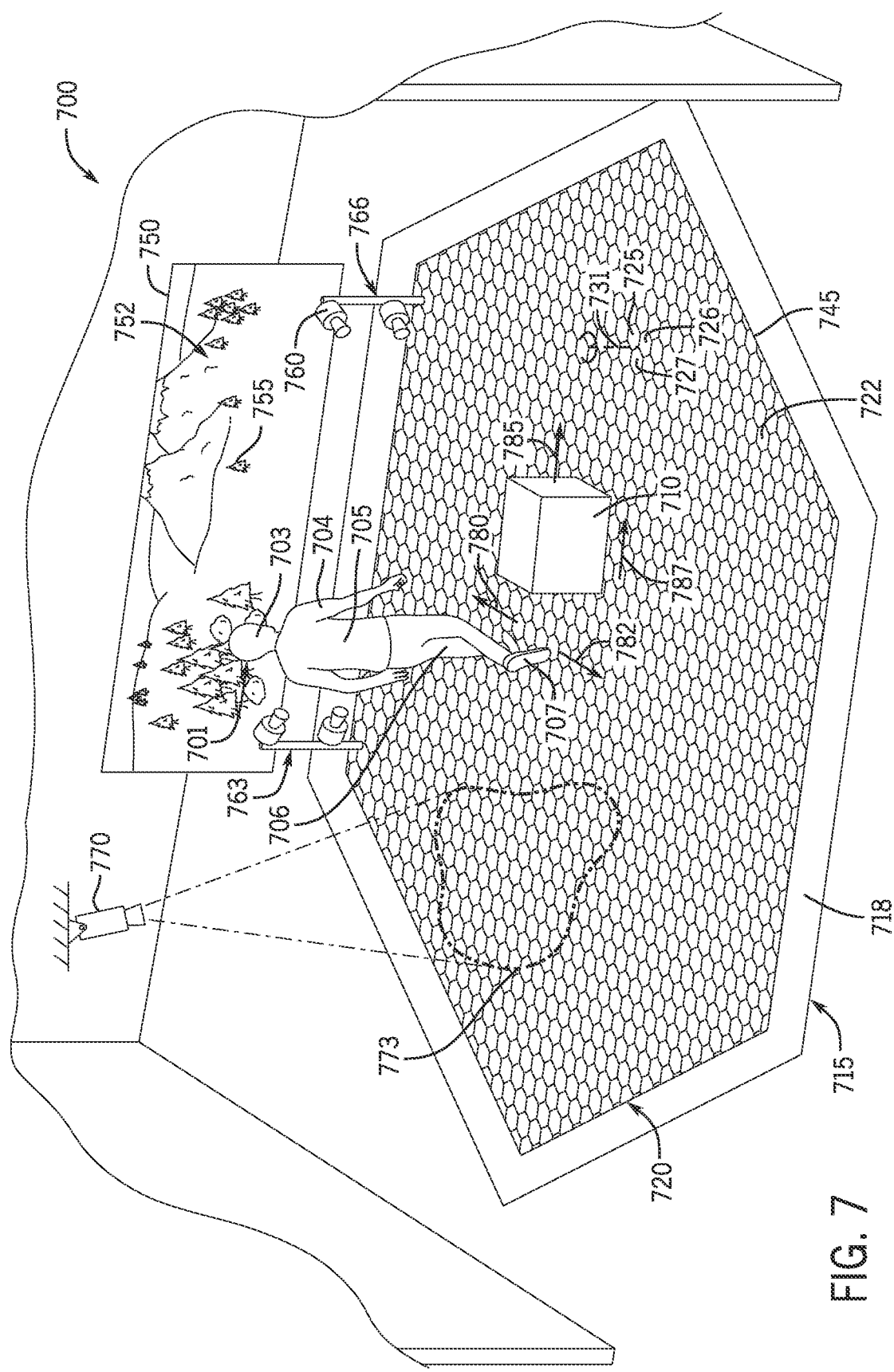
FIG. 7 illustrates a perspective view of an example system including a modular floor providing an interactive user experience.

Turning to the system as a whole with continued reference to FIG. 7, a user 701 or an object 710 may be positioned on the modular floor 720 for the immersive interactive experience provided by the interactive content 752. The system 700 may generate an immersive interactive experience for the user 701 to move naturally or independently while on the modular floor 720. The movements of the user 701 or movements of the active tiles 722 may correspond to visual content 755 of the interactive content 752, providing an immersive experience to the user 701, e.g., allow the user 701 to actually experience movement in a manner that corresponds to the content 752 that is not possible with other types of video gaming experiences.

With respect to the interactive content 752, the interactive content 752 may simulate a three dimensional virtual environment such as a world, game, or other interactive experience. The interactive content 752 may provide visual portions or visual content 755 providing visual representations of the virtual environment. The interactive content 752 may simulate and/or recreate physical feedback of the virtual environment with the modular floor 720. For example, terrain of the virtual environment may be simulated by the movement generated by the modular floor 720 or the responses of the modular floor 720 to the movements of the user 701.

The display 750 may be positioned adjacent the modular floor 720 and within a field of view of the user 701 or the display 750 may be a wearable device worn by the user 701. In examples where the display 750 is a wearable device, a separate display 750, such as a screen, may be included or omitted from the system 700. The display 750 or projector 770 may display the visual content 755 of the interactive content 752 to the user 701. The projector 770 may project the images 773 on the modular floor 720, or elsewhere on the system 700, to increase the immersive experience. In various examples, the projector 770 and the display 750 may be used together. For example, the image 773 or display 750 may supplement the other. For example, one of the display 750 or the projector 770 may provide a main visual content for viewing by the user 701 and the other may generate an extension of, or background corresponding to, the main visual content. In other examples, the system 700 may use only the projector 770 or the display 750.

The sensors 760 may be positioned adjacent the modular floor 720. The sensors 760 may monitor positions, movements, or orientations of the user 701. In some examples, an object 710 is additionally placed on the modular floor 720 and the sensors 760 may monitor the position, movement, or orientation of the object 710. In examples with multiple sensors 760, the sensors 760 may be spaced apart or positioned at various sides of the modular floor 720 to assist in determining positions or movements (e.g. triangulate) of the user 701 or object 710. For example, the first grouping or plurality of sensors 763 may be spaced from the second grouping or plurality of sensors 765.

With respect to the sensors 760, the sensors 760 may detect the various movements or positions of the user 701 or the object 710 in relation to the modular floor 720. The modular floor 720 may be in communication with the sensors 760 or the interactive content 752. The movement generated by the modular floor 720 may correspond to information detected by the sensors 760 or generated by the interactive content 752. In some examples, sensors 760 may be included in the modular floor 720 or in devices carried or worn by the user 701. For example, sensors 760 in the modular floor 720 may determine which active tile 722 or disk assembly 130 may be in contact with a user 701 or object 710. Sensors 760 on the user 701 may assist in detecting motion, movements, or orientations of the user 701.

When the user 701 is on the modular floor 720, the modular floor 720 may simulate movement or environments corresponding to the interactive content 752. To simulate movement corresponding to the interactive content 752, the active tiles 722 of the modular floor 720 may move in response or impart motion on the user 701. For example, the active tiles 722 may generate motion to counteract a user's 701 movement, increase the effect of the movement, or induce movement of the user 701 in varying additional directions. The sensors 760 may communicate the user's 701 position to the modular floor 720 to improve the immersive experience. For example, the sensors 760 may determine the user 701 is taking steps of a certain stride length and correspondingly activate or manipulate tiles 722. The sensors 760 may detect the user 701 is leaning, oriented, or balanced in a certain manner and activate the tiles 722 in a corresponding manner to keep the user 701 upright. The sensors 760 may also detect when the user 701 is nearing the boundary 745 of the modular floor 720 and either move the user 701 away from the boundary 745 or provide visual or audio feedback to alert the user 701.

In an example of user 701 movement, the user 701 may begin walking in a first direction 780. To maintain the user 701 in a location on the modular floor 720, the active tiles 722 may generate movement in a second direction 782 opposite to the first direction 780. By providing motion in a second direction 782 different from the first direction 780, the active tiles 722 may counter the walking motion of the user 701 and simulate walking in the interactive content 752. In various examples, the modular floor 720 may simulate or allow running, jumping, or a variety of other movements in a virtual environment for the user 701. Further, the modular floor 720 may generate motion in different directions or magnitudes than movement by the user 701. For example, the differing direction or magnitudes of movement generated by the modular floor 720 may simulate slipping, falling, sliding, uneven terrain, or various other experiences.

In some examples, the modular floor 720 may move a stationary user 701 or object 710. For example, with reference to the object 710, to move a stationary feature in a desired direction 785, the active tiles 722 may also generate movement in a direction 787 aligned with the desired direction 785. The system 700 may position objects 710 by the modular floor 720 to interact with the user 701. In some examples, the system 700 may move the user 701 to facilitate engagement with the interactive content 752.

The system 700 may include the computing system 600 as described with respect to FIG. 6. For example, the interactive content 752 may be instructions read into the memory 602 or stored in another computer readable/usable medium, such as the static storage 604 or the dynamic storage 606. The processor 608 may be in electrical communication with the display 750 or projector 770 to display visual portions 755 of the interactive content 752. The processor 608 may be in communication with the sensors 760 or modular floor 720. For example, the processor 608 may generate instructions or commands to the modular floor 720 in response to a detected position of the user 701 by the sensors 760. Similarly, the processor 608 may communicate with the display 750 to modify the visual content 752 in response to an input, action, movement, or orientation of the user 701.

In operation, a user 701 of the system 700 may be positioned on the modular floor 720. The visual portion 755 of the interactive content 752 may be displayed to the user 701. In a specific example, the interactive content 752 may correspond to a hike through a wilderness. The visual portion 755 may be displayed by the projector 770 or the display 750. For example, the visual portion 755 at the display 750 may be depict a wide-ranging view of the virtual environment. The projector 770 may provide an image 773 depicting immediate surroundings of the user 701 in the virtual environment. With reference to the specific example, the visual portion 755 at the display 750 may show a forest and horizon of the wilderness, and a path extending through the wilderness. The visual portion 755 represented by the image 773 may depict the path the user 701 is traversing. As the user 701 walks, the visual portion 755 may update to show different perspectives based on the orientation of the user 701 or their simulated progress in the virtual environment.

The user 701 may move in a manner corresponding to the interactive content 752 by the modular floor 720. As discussed above, the sensors 760 may monitor the positions of the user 701. The modular floor 720 may move in a manner corresponding to the detected position, orientation, or movement of the user 701 as detected by the sensors 760. For example, the modular floor 720 may move the user 701 in a manner corresponding to the interactive content 752 or the user's 701 actions in relation to the interactive content 752. With reference to the specific example, the user 701 may walk as if they are following a trail and the modular floor 720 may move to counter the steps of the user 701 to maintain the user's position on the modular floor 720. The interactive content 752 may correspond to a virtual environment including slippery conditions on a trail, such as mud or ice. Correspondingly, the modular floor 720 may simulate the slippery conditions by moving the user's 701 feet 707 in varying directions while on the modular floor 720. In some examples, the system 700 may also include speakers or other devices to generate audio corresponding to the user's 701 movements or the interactive content 752. For example, the motion of the modular floor 720 may be modulated by the audio of the interactive content 752. In one example, sounds similar to a person walking or sliding on gravel may be played with a step of the user 701 on the modular floor 720 to increase the immersion in the simulated hiking experience. In other examples, the music or special effect sounds may be produced responsive to the user performing an action.

Accordingly, the system 700 provides benefits that are not otherwise possible with existing systems or technologies. For example, because the system 700 and the modular floor 720 both induce movement and enable movement of the user 701, the user 701 may physically feel, or engage with, the interactive content 752 or simulated experiences. Accordingly, the present system 700 allows both physical and visual immersion with interactive content 752. In contrast, other systems may be limited to only visual feedback or only receive limited movements or physical feedback from the user. For example, current systems may only allow limited physical feedback through haptics on a handheld controller or detect movements of the handheld controllers. In some examples, the movement or induced movement of the user 701 by the modular floor 720 may also provide a cardio experience or other physical exertion adding to the realism of the interactive content 752 and providing new possibilities for both content creators and users. Further, the system 700 and modular floor 720 enables physical feedback in a limited or relatively small geographic area, which would otherwise only be possible in a large geographic space.

Any of the features, components, and/or parts, including the arrangements and configurations thereof shown in any one of FIG. 7 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 7.

Figure 8:
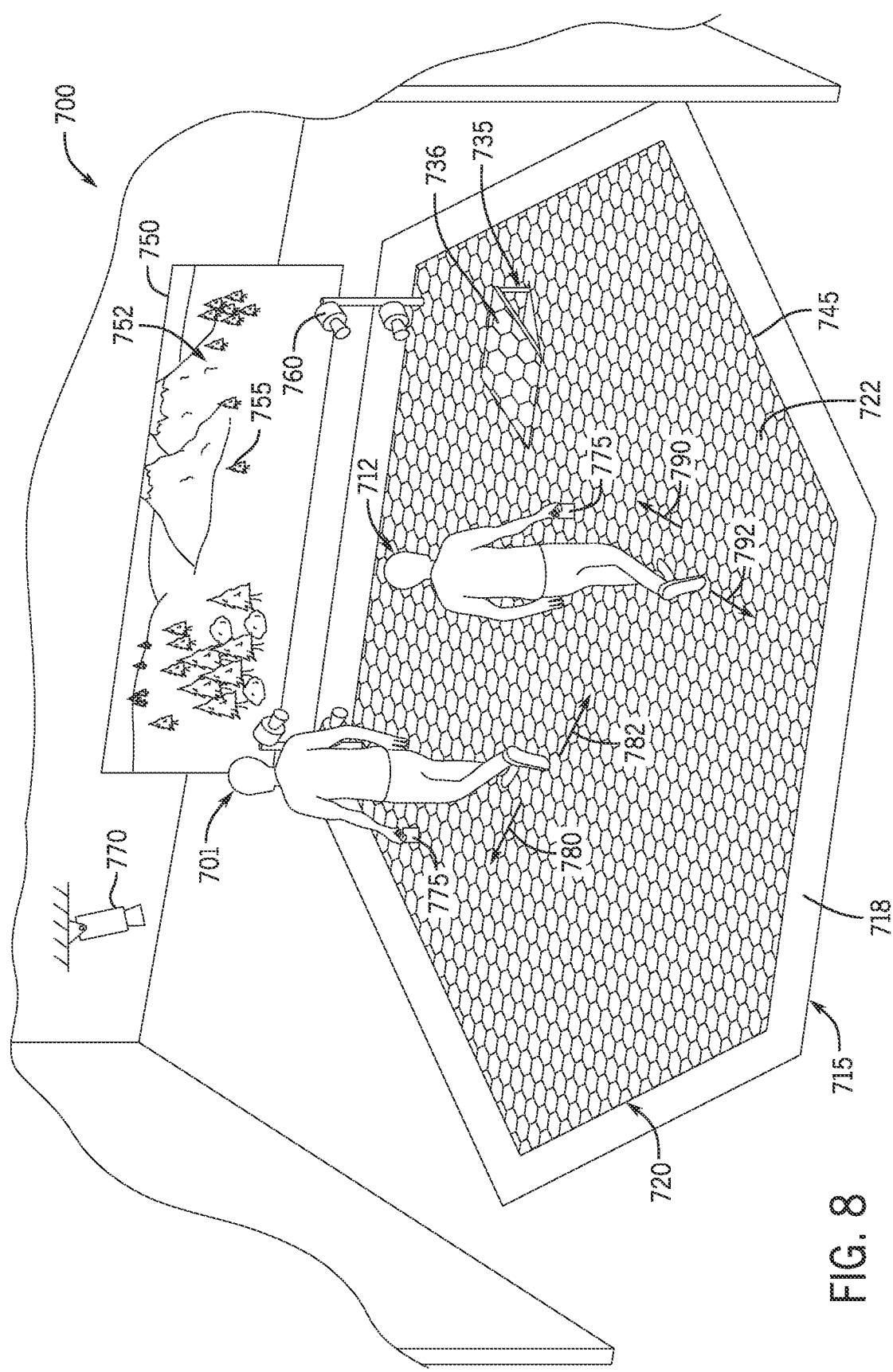
FIG. 8 illustrates an example system providing an interactive user experience and including two users.

Continuing to FIG. 8, an example of the system 700 including two or more users 701 is illustrated. The system 700, as depicted in FIG. 8, may also include an elevating assembly 735 to provide modular floor 720 with a varying slope or grade (e.g. simulate vertically oriented movement). The system 700 may also include input devices 775 to receive an input to the system 700 from one or more users 701.

The system 700 in FIG. 8 may similarly include a modular floor 720 with a plurality of tiles 722. The modular floor 720 may be on a platform 715. The platform 715 may include stationary floor 718 around the perimeter 745 of the modular floor 720.

The modular floor 720 may further include the elevating system or assembly 735. The elevating assembly 735 may raise or slope one or more tiles 722 to define a difference in elevation or elevated surface 736. The elevating assembly 735 may also lower one or more tiles 722. Relative to the non-elevated tiles, the elevated surface 736 may be sloped (e.g. smooth transition) or angled (e.g. abrupt transition). While the tiles 722 of the elevated surface 736 are depicted as being separated from the non-elevated tiles 722, the elevating assembly 735 may be arranged under modular floor 720 in a manner to keep active tiles 722 in contact with adjacent tiles 722. In some examples, the entire modular floor 720 may be raised, reoriented, or elevated. The elevated surface 736 may simulate vertical changes or sloping surfaces corresponding to the interactive content 752.

The system 700 may similarly include a display 750 or a projector 770 to display visual portions 755 of the interactive content 752 or images 773. The system 700 may also include one or more sensors 760 to monitor, positions, orientations, or actions by a user 701.

As depicted in a FIG. 8, a first user 701 may similarly move on or be moved by the modular floor 720. For example, the user 701 may desire to move in a first direction 780 and the modular floor 720 may act to maintain the users' position and simulate movement by causing relative motion in a direction 782 transverse to the first direction. As depicted in FIG. 8, a third party or second user 712 may interact with the system 700. The second user 712 may be positioned on or adjacent the modular floor 720 along with the first user 701. In some examples, the second user 712 may be positioned on the stationary floor 718 for interaction with the system 700, or in various other positions. The sensors 760 may track positions, orientations, movements, or relative positions of either user 701, 712 or both users 701, 712 together.

Similar to the first user 701, the second user 712 may move on or be moved by the modular floor 720 in a manner corresponding to the interactive content 752. For example, the secondary user may desire to move in a primary direction 790. The system 700 may use the sensors 760 to determine the movement of the second user 712 and correspondingly manipulate the tiles 722 to move the user in a secondary direction 792 to counter the secondary user's 712 movement. The tiles 722 corresponding to the first user 701 may be independent of the tiles corresponding to the secondary user 712. Accordingly, both the first user 701 and the second user 712 may engage with the interactive content 752 at the same time.

In some examples with two or more users 701, the users 701, 712 may experience the same interactive content 752 or interactive content 752 independent or separate of the other user 701, 712. For example, the users 701, 712 may have their own displays 750 (e.g. two or more screens or headsets) and the displays 750 may produce different interactive content 752, or different visual portions 755 of the interactive content 752. Accordingly, two or more immersive experiences may be operated on a single modular floor 720. In some examples, the interactive content 752 may be tied to a proximity of the user 701 to a location on the floor 720 or to another user 712. For example, the interactive content 752 may transition from a first interactive content 752 or first visual portion 755 to a second interactive content 752 or second visual portion 755 by a user moving nearer another location or user 701.

In some examples, the system 700 includes input devices 775 for receiving an input from the users 701, 712. The input devices 775 may be a controller, mobile device, wearable device, or a variety of other devices in communication with the system 700. For example, the input devices 775 may include sensors 760, switches, buttons, or screens to receive an input from the users 701, 712. The input devices 775 may be in communication with or used in combination with the sensors 760. The inputs may correspond to the interactive content 752. For example, the interactive content 752 may simulate an action that would require ductile movement (e.g. fine or discrete motor movements), and the input device 775 may be designed to receive the input from the ductile movement. The input devices 775 may also provide feedback to the users. For example, the input devices 775 may vibrate, generate an additional display, or other feedback.

In some examples, the input received by one user (e.g. user 701) may affect another user (e.g. user 712). For example, the input may correspond to the virtual environment of the interactive content 752, such as the visual portion 755. In some examples, the input may change the motion of active tiles 722 corresponding to the user 712. Accordingly, users may engage with each other through inputs or the interactive content 752.

While description is given with respect to the two users 701, 712 shown in FIG. 8, it is appreciated that any numbers of users (e.g. a plurality of users) may utilize or interact with the system 700. The total number of the plurality of users may be limited only by the number of users that are able to fit on or adjacent the modular floor 720 (e.g. the size of the modular floor 720 or platform 715). In examples with a plurality of users, the sensors 760 may detect the plurality of users individually. The sensors 760 may be in communication with the modular floor 720, or individually with the tiles 722 or disk assemblies 130. Accordingly, as long as an independent tile 722 or disk assembly 130 is available for one of the plurality of users, the modular floor 720 may induce or respond to a motion of any of the plurality of users as detected by the sensors 760.

Any of the features, components, and/or parts, including the arrangements and configurations thereof shown in any one of FIG. 8 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 8.

Figure 9:
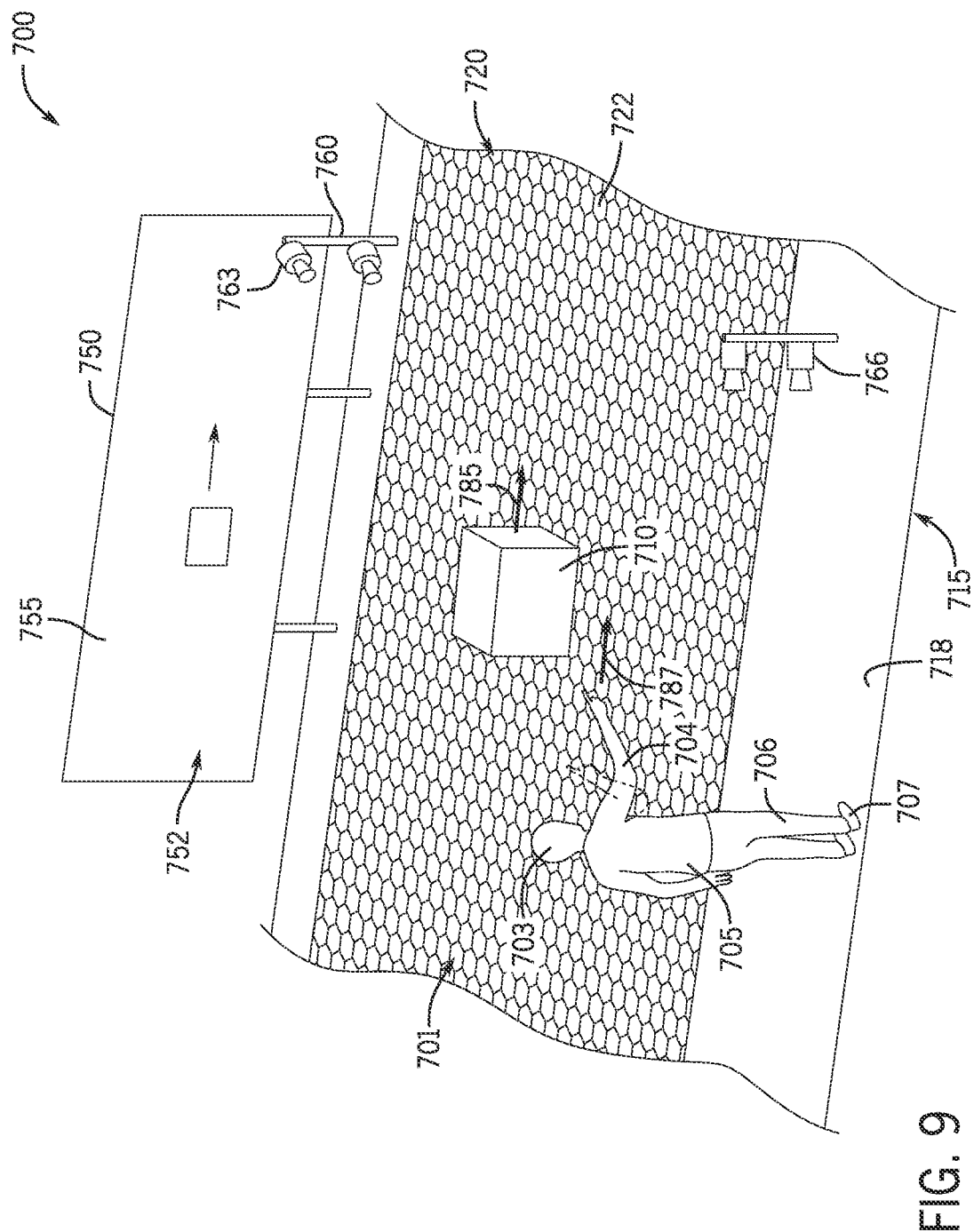
FIG. 9 illustrates an example of the system in which the user controls the movement of an object.

FIG. 9 depicts an example of the interactive system 700 where a user 701 can control the movement of an object 710 by the modular floor 720. The user 701 may control the movement of the object 710 through gestures, actions, or body language detected by the sensors 760.

The system 700 depicted in FIG. 9 may include similar features as described above with respect to FIGS. 7 and 8. For example, the system 700 may include the modular floor 720 including a plurality of active tiles 722. The modular floor 720 may be located on a platform or region 715. The platform 715 may include stationary floor 718 adjacent the modular floor 720.

The system 700 may include a display 750 for depicting a visual portion 755 of interactive content 752. The system 700 may include a one or more sensors 760. For example, the sensors 760 may include a first group of sensors 763 and a second group of sensors 766.

The user 701 of the system 700 may have multiple body parts or appendages detectable or distinguishable by the sensors 760. For example, as discussed above, the user 701 may have a head 703, an arm 704, a torso or upper body 705, legs 706, or feet 707 one or all of which may be detectable by the system 700. The various arrangements of the user's 701 appendages may be intended to convey meaning. For example, the arrangement of appendages may correspond to a gesture, action, body language, or where a user 701 may be directing their attention, where the system 700 may detect certain gestures or actions and correlate those to a particular input or instruction. In this way, the system can readily adapt to different immersive environments and games that allow multiple types of user input and interactions, which may not be possible with conventional game input devices.

The system 700 may include one or more objects 710 that may correspond to various types of items. For example, the object 710 may be one or more of a feature corresponding to the interactive content 752 (e.g. a feature having or corresponding to a thematic element), an item containing or supporting a second object (e.g. shipping container, boxes, etc.), or another user. In some examples, one or more combinations of items may be included.

During use of the system 700, the user 701 may be positioned on the platform 715. The user 701 may be located on the modular floor 720 or the stationary floor 718 adjacent the modular floor 720. The object 710 may be positioned on the modular floor 720. The various sensors 760 may detect the positions or orientation of the user 701 or the object 710. For example, the first group of sensors 763 may be directed to the modular floor 720 to detect the positions, orientations, or movements of the object 710. The second group of sensors 766 may be directed to the user 701 to detect the gestures, positions, orientations, or movement of the user 701.

As an input to the system 700, the user 701 may move one or more appendages corresponding to an action or gesture. For example, the user 701 may extend an arm 704 outward in a direction relative to the object 710. The extended arm 704 may indicate a desired direction of movement 785 or position of the object 710. Accordingly, the sensors 760 detect the gesture and relative positions of the user 701 and object 710 and move the object 710 in a direction 787 corresponding to the desired direction of movement 785. In some examples, the user 701 can point to the object 710 and/or move his or her appendage in some direction. The object 710 may be moved by the modular floor 720 to correspond with the movement of the appendage as though the object 710 were attached or linked to the moving appendage (e.g., to replicate a force or magical effect of the user on the object). In some examples, multiple objects 710 may be located on the modular floor 720. The gestures or actions of the user 701 may correspond to a direction of movement for the multiple objects or a subset (e.g. one or more) of the objects 710. In such examples, the sensors 760 may detect a body language or orientation of the user 701 relative to the objects to interpret the gesture. For example, a user 701 with his or her torso 705 square to an object and feet 707 pointed at a first object may indicate that the first object is the object 710 intended to be moved.

In some examples, it is appreciated the gestures of the user 701 may correspond to an intended movement of the user 701 themselves. Accordingly, the system 700 may move the user 701 in a direction corresponding to their gesture, e.g., pointing an arm or finger in a certain direction can generate a forward motion in that same direction by the system 700 on the user.

In some examples, it is appreciated that the user 701 and one or more of the sensors 760 may be remotely located from the modular floor 720. Accordingly, the user 701, through gestures or other inputs may remotely control the movement of the object 710 by the modular floor 720.

During use, the visual portion 755 of the interactive content 752 may correspond to the positions of the object 710 on the modular floor or content represented by the object 710. In some examples, the interactive content 752 may be directed to assist in industrial use and the platform 715 may be located in a shipping yard or warehouse. The interactive content 752 may be a navigation or shipping system for moving the objects 710 through the warehouse. Accordingly, the visual portion 755 may be a map showing the movement of the object 710 through the warehouse. Such a system 700 may allow users 701, such as workers, to quickly and easily move multiple objects without requiring training to operate heavy machinery.

In some examples, the interactive content 752 may be a game or puzzle. In such an example, the object 710 may be positioned in a game area or maze. The visual content 755 may correspond to the game area and the user 701 may control the movement of the object 710 by the system 700. Accordingly, the system 700 may provide an interaction with real world objects by inputs to the system 700.

Any of the features, components, and/or parts, including the arrangements and configurations thereof shown in any one of FIG. 9 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 9.

Figure 10:
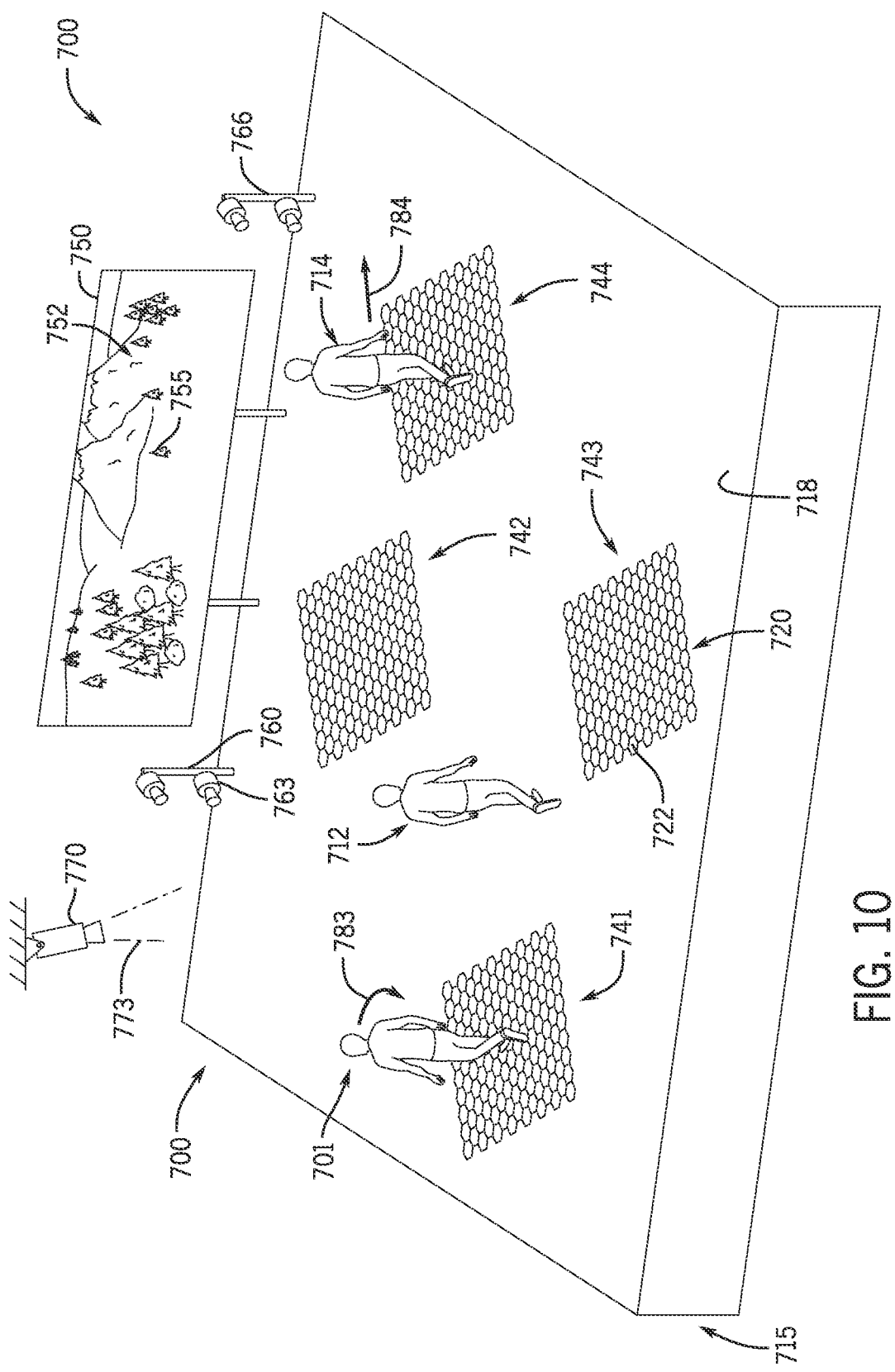
FIG. 10 illustrates an example of the system including more than one groupings of active tiles.

FIG. 10 depicts an example of the system 700 including a modular floor 720 arranged into multiple separate regions. In such an example, multiple users 701 may be located on or adjacent the various tile regions.

The system 700 of FIG. 10 may include a platform 715 including the modular floor 720 and the stationary floor 718. The modular floor 720 may include a plurality of active tiles 722 as previously discussed. The modular floor 720 may be arranged into multiple separate groupings or regions. For example, the modular floor 720 may be arranged into a first region 741, a second region 742, a third region 743, or a fourth region 744. The various regions may be separated by the stationary floor 718. It is appreciated that any number of total number of regions may be used as are able to fit on the platform 715, as may be determined by the size of the regions or the size of the platform 715. In some examples, the groupings of the modular floor 720 may not be physically separated, such as by the stationary floor 718, but rather operated independently such that a first grouping moves or induces movement differently from an adjacent grouping. In one example, one of the two adjacent groupings of the tile floor 720 remains stationary and the other induces or responds to movement of the users.

The system 700 of FIG. 10 may include one or more of the components previously described. The system 700 may include a display 750 to depict a visual portion 755 of interactive content 752. In some examples, the display 750 may include or be a projector 770 generating an image 773 corresponding to the interactive content 752. The system 700 may include one or more sensors 760 for detecting movements, positions, orientations of users 701, as discussed previously. For example, the sensors 760 may include a first group of sensors 763 and a second group of sensors 766.

Multiple users may interact with the system 700. For example, as depicted in FIG. 10, there may be a first user 701, a second user 712, or a third user 714. The users may be positioned at various locations on the platform 715 during use. For example, the first user 701 may be positioned on the first region 741 of the modular floor 720. The second user 712 may be positioned on the stationary floor 718 adjacent the second 742 and third regions 743. The third user 714 may be positioned on the fourth region 744 of modular floor 720. The users may move or transition on or between the various regions.

In operation, the sensors 760 may detect the positions, movements, or orientations of the various users. For example, the sensors 760 may detect the users individually. As the users move between or are positioned on the regions or groupings of the modular floor 720, the modular floor 720 may be selectively activated to respond or impart motion on the users. For example, the first user 701 may be detected at the first region 741 of the modular floor 720 by the sensors 760. The sensors 760 may be in communication with the first region 741 and cause motion 783, such as rotational motion, of the user 701. Similarly, the sensors 760 may detect the third user 714 is located at the fourth region 744 and move the user 714 in a direction 784 by the active tiles 722. The sensors 760 may track the position of users not on the modular floor 720, such as the second user 712, so as to activate the modular floor 720 for the user when if they step on region of the modular floor 720.

In one example of the system 700 as depicted in FIG. 10, the system 700 may be a theatrical production. In such an example, the users may be actors and the interactive content 752 may correspond to the narrative of the production. The platform 715 may be a stage and the various regions of modular floor 720 may be set into the stage 715. For example, the modular floor 720 may be camouflaged or hidden from an audience within the stationary floor 718 of the stage 715.

The display 750 may depict visual content 755 corresponding to the narrative or thematic elements of the display. The projector 770 may generated images 773 providing visual effects to the production. In some example, the images 773 may be projected onto the users or actors to change their appearance or draw attention to certain actors. The modular floor 720 may maintain positions of the user relative to the projector 770 to improve the accuracy of the projected image 773 on the user. Accordingly, a more detailed image 773 may be projected accurately by using the modular floor 720.

During the production, the movement of the users 701 may correspond to a dance or choreographed routine. As the users move, the modular floor 720 regions may be utilized in the dance or routine to provide new possible combinations of movements. For example, the modular floor 720 may allow a user to run while staying in place, providing realism to an action that would require acting. In other examples, the modular floor regions 720 may allow a user to move at superhuman speeds or otherwise perform feats not otherwise possible during live entertainment. Further, by dispersing the modular floor 720 in multiple locations adjacent stationary floor 718, the actor may move naturally on the stationary floor 718 then appear to magically gain speed or move by stepping on the regions of the modular floor 720.

In some examples, the various regions of modular floor 720 may be operate independently but be used for a common purpose. One example may be the theatrical production described above. In some examples, groups of users are associated with the groups or regions of the modular floor 720 and the various groups may compete against one another in a game. Additional examples may include group exercise routines, where the interactive content 752 correspond to a workout routine.

Any of the features, components, and/or parts, including the arrangements and configurations thereof shown in any one of FIG. 10 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 10.

Figure 11:
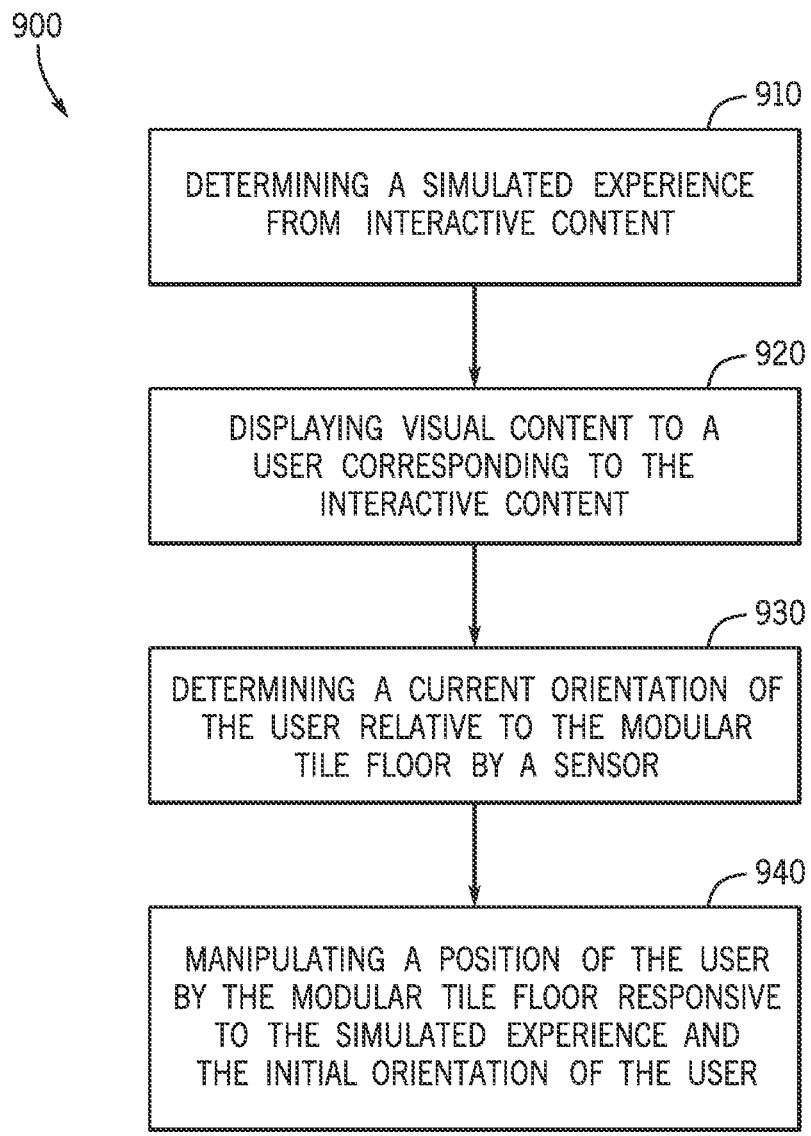
FIG. 11 illustrates a flow chart providing an example method of using the system.

Turning to FIG. 11, an example method 900 for providing an interactive user experience using the system 700 as described herein is depicted. The method 900 may begin with step 910. At step 910, the system 700 may determine a simulated experience from interactive content 752. For example, the interactive content 752 may be an outdoor adventure experience simulating a virtual environment. The system 700 may determine a beginning or starting point for a user 701 in the virtual environment. The system 700 may determine whether to activate either or both the projector 770 or display 750. The system 700 may determine whether one or more users are on the modular floor 720. Accordingly, the system 700 may arrange the interactive content 752 to receive separate inputs from the users or provide content responsive to the actions of the user.

The method 900 may proceed to step 920. At step 920, the system 700 may display visual content 755 corresponding to the interactive content 752. For example, the system 700 may include projectors 770 or a display 750. The visual content 755 may be provided at the display 750 or as an image 773 provided by the projector 770. In some examples, the display 750 may be a wearable device, such as a headset, worn by a user 701 and the visual content 755 may be provided to the user 701.

The method 900 may proceed to step 930. At step 930, the system 700 may determine a current orientation of the user 701 relative to the modular floor 720 by a sensor 760. For example, the user 701 may be positioned on the modular floor 720. The user 701 may be moving, oriented, or performing a variety of gestures. The sensors 760 may be positioned adjacent the modular floor 720, within the modular floor 720, or on the user 701. The detected orientation of the user 701 may correspond to the user's engagement with the interactive content 752. For example, in a simulated experience providing an outdoor adventure experience the user 701 may be moving or positioned to climb or hike a virtual trail. The system 700 may detect or determine which active tiles 722 of the modular floor 720 the user 701 is positioned on.

The method 900 may proceed to step 940. At step 940, the system 700 may manipulate a position of the user 701 by the modular tile floor 720 responsive to the simulated experience or current orientation of the user 701. For example, if the current orientation of the user 701 corresponds to the user 701 walking, the modular floor 720 may move the user 701 counteract the user's 701 steps. If the simulated experience provided by the interactive content 752 provides a slippery trail or ice, the tiles 722 may move the user's 701 feet 707 on the active tiles 722 to simulate the slippery conditions.

Any of the features, components, and/or parts, including the arrangements and configurations thereof shown in any one of FIGS. 7-11 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 7-11. Additional arrangements or uses of the system 700 are contemplated herein. Some examples are provided below.

In some examples, the visual portion 755 of the interactive content 752 is displayed by the projector 770. For example, the image 773 may be the visual portion of the interactive content. The visual portion 755 may correspond to a map or image of a location or region. Various objects 710 may be placed on the modular floor 720 to provide depth, texture, or assist in simulating the interactive content 752. For example, the objects 710 may represent map locations or regions. Users 701 may navigate the modular floor 720 to simulate traversing the map or region. In some examples, portions of the map may be depicted by the image 773, and the image 773 may update as the user 701 moves to simulate traversing the map. Accordingly, the system 700 may use the interactive content 752 for map-based games or educational tools. The system 700 may provide audio, visual, or physical effects corresponding to the region. For example, interactive content 752 including a map of California may simulate earthquakes by shaking or oscillating the modular floor 720. A map of a desert may simulate walking on sand by simulating shifting sands by moving the modular floor 720 to shift the user's 701 feet 707.

In some examples, the system 700 may be used for games. The system 700 may similarly project an image 773, such as a game board or game area, on the modular floor 720 corresponding to the game. In one example, the interactive content 752 of the system 700 is a tag game. For example, multiple users 701 may be on the modular floor 720 and move towards or away from each other. The image 773 may simulate obstacles, traps, boosts, or other game related content. The modular floor 720 may vary the speeds of the users 701 corresponding to the interactive content 752 (e.g. game rules). For example, some users 701 may have different assigned movement abilities and the modular floor 720 may independently adjust the speed of the users 701 by counteracting or assisting their movement by the floor 720. In some examples, a user 701 may be prohibited from moving by the interactive content 752 (e.g. freeze tag), and the modular floor 720 may move the user 701 back to a location if the user 701 attempts to leave.

In some examples, the objects 710 may be used with interactive content 752 corresponding to games. For example, the interactive content 752 may correspond to chess and the user 701 may either control chess pieces on the modular floor 720, which may be simulated or represented by objects 710 placed in assigned locations on the floor 720. In some examples, the user 701 may act as a chess piece and be moved by the modular floor 720. Various other games may similarly use objects 710, such as a bowling simulator, where a virtual ball may be thrown by the user 701 and the modular floor 720 may move or knock down pins corresponding to the user's 701 throw. In some examples, the user 701 may imitate a virtual ball where the user 701 bowls over virtual pins displayed on the modular floor 720 (e.g. by image 773) and/or on the display 750 as a visual portion 755.

In some examples, the system 700 may be used for health and fitness exercises. For example, the modular floor 720 may act as a running or walking platform. The interactive content 752 may be workout programs such as fitness classes or agility training programs. Accordingly, the modular floor 720 may move the users 701 or facilitate movement by the user 701 in a manner corresponding to the fitness programs. The present system 700 may differ from existing workout equipment having a display because the modular floor 720 provides a greater immersion in the workout program (e.g. interactive content 752). For example, the modular floor 720 may enable the user 701 to walk or move in a variety of directions in contrast to existing workout equipment commonly allowing only a single predefined method or direction of movement. In some examples, the modular floor 720 may also adapt to characteristics of the user's 701 workout, such as changes in pace of the user 701 as detected by sensors 760 or orientation relative to the floor 720 as detected by sensors 760, or updating the visual content 755 corresponding to the user's 701 actions, such as a new virtual environments reached by traveling a simulated distance or a next workout or circuit.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An interactive user experience system comprising:
a processor;
a display in electrical communication with the processor and configured to display a visual content of interactive content;
a modular tile floor in electrical communication with the processor and comprising:
a plurality of tiles configured to move independently to induce or respond to a desired motion for a user in contact with the modular tile floor;
an object positioned on the modular tile floor, wherein the object is separate from the user and positioned to define a gap between the object and the user along the modular tile floor, and wherein a position of the object is controlled by the modular tile floor; and
a sensor in electrical communication with the processor, wherein the sensor is configured to detect at least one of an orientation or a position of the user on the modular tile floor, and determine a gesture of the user, the gesture indicating a desired direction of movement of the object;
wherein based on the detected orientation or position of the user, the processor is configured to modify at least one of the visual content or a movement of at least one of the plurality of tiles, and
wherein the processor is configured to move the object in a direction corresponding to the desired direction of movement of the object.

2. The interactive user experience system of claim 1, wherein the display is one or more of a wearable display, a projector, or an electronic screen.

3. The interactive user experience system of claim 2, wherein the display comprises the projector and the projector is configured to display the visual content on the modular tile floor.

4. The interactive user experience system of claim 1, wherein
the visual content depicts a simulated environment.

5. The interactive user experience system of claim 4, wherein:
the sensor is further configured to detect a motion of the user as feedback corresponding to the interactive content;
wherein based on the detected motion of the user, the processor modifies the movement of the at least one of the plurality of tiles; and
the movement of the at least one of the plurality of tiles changes the position of the user corresponding to the motion of the user.

6. The interactive user experience system of claim 1, further comprising:
an elevating system configured to raise or lower a first set of tiles of the plurality of tiles to define a difference in elevation relative to a second set of tiles of the plurality of tiles;
wherein the difference in elevation corresponds to the visual content.

7. The interactive user experience system of claim 1, wherein the visual content is correspondingly updated in response to one or more of a change in the position of the user, a change in the orientation of the user, or a motion of the user.

8. The interactive user experience system of claim 1, wherein the sensor is one or more of a light ranging and detection system, a camera, or a wearable motion capture device.

9. The interactive user experience system of claim 1, wherein:
the sensor is configured to determine the position of the user on the modular tile floor; and
the desired motion prevents the user from crossing a boundary of the modular tile floor.

10. The interactive user experience system of claim 1, further comprising:
an input device in communication with the processor or the modular tile floor and corresponding to the interactive content;
wherein the input device is configured to receive an input from the user and provides feedback to the user.

11. The interactive user experience system of claim 10, wherein the input device is configured to receive a second input from a second user different from the user, the second input providing feedback to the user.

12. The interactive user experience system of claim 1, wherein the movement of the at least one of the plurality of tiles is correspondingly updated in response to one or more of a change in the position of the user, a change in the orientation of the user, a motion of the user, or a change in the visual content.

13. The interactive user experience system of claim 1, wherein the object is an inanimate object.

14. A method for providing an interactive user experience with a modular tile floor, the method comprising:
determining a simulated experience from interactive content;
displaying visual content to a first user and a second user corresponding to the interactive content;
determining a current orientation of the first user and the second user relative to the modular tile floor by a sensor;
manipulating a position of the first user and the second user by the modular tile floor responsive to the simulated experience and the current orientation of the first user and the second user;
receiving an input from the first user to control a movement of the second user on the modular tile floor; and
changing, based on the input from the first user, a motion of the modular tile floor corresponding to the second user.

15. The method of claim 14, further comprising:
determining an action of the first user by the sensor; and
providing feedback to the first user by the modular tile floor, the feedback corresponding to the action and the interactive content.

16. The method of claim 14, further comprising:
determining an action of the first user by the sensor; and
updating the visual content corresponding to the action and the interactive content.

17. The method of claim 14, further comprising:
receiving a user input from a user device; and
providing feedback to the first user corresponding to the user input and the interactive content.

18. The method of claim 14, further comprising:
manipulating a position of at least one object on the modular tile floor.

19. The method of claim 18, wherein the manipulating the position of the at least one object comprises:
determining a gesture of the first user or the second user, the gesture indicating a desired direction of movement of the at least one object; and moving the at least one object in a direction corresponding to the desired direction of movement of the at least one object.

\* \* \* \* \*